Jan. 15, 1952 A. G. PINCUS 2,582,453
ABSORBING GLASS AND METHOD OF MAKING SAME
Filed July 2, 1948 3 Sheets-Sheet 2

INVENTOR.
ALEXIS G. PINCUS
BY
Louis L. Gagnon
ATTORNEY

Fig. 3

Patented Jan. 15, 1952

2,582,453

UNITED STATES PATENT OFFICE 2,582,453

ABSORBING GLASS AND METHOD OF MAKING SAME

Alexis G. Pincus, Worcester, Mass., assignor to American Optical Company, Southbridge, Mass., a voluntary association of Massachusetts Application July 2, 1948, Serial No. 36,765

21 Claims. (Cl. 106—52)

1

This invention relates to improvements in absorption glass and has particular reference to ultra-violet absorbing glass for use in the manufacture of lenses, filters and similar light transmitting mediums. It also relates to an improved method of making such glass.

One of the principal objects of the invention to produce an ultra-violet absorbing glass for use in the manufacture of light transmitting mediums, filters, eye protection and other types of lenses and the like, said glass being made from a batch containing quantities of vanadium as an ultra-violet absorbent and manganese as a color controlling ingredient, and melted under specific conditions so as to produce a glass comparable to or better than present most commonly known cerium-containing ultra-violet absorbing glass.

It is another important object of the invention to provide an improved absorbing glass of the above character of a controlled color and having less than 5% ultra-violet transmission up to approximately 356 millimicrons in the ultra-violet region of the spectrum with at least 75% overall transmission in the visible region of the spectrum, and the method of producing such improved absorbing glass.

It is another important object of the present invention to provide an improved absorbing glass of the above character of a controlled color and having less than 1% ultra-violet transmission up to 365 millimicrons in the ultra-violet region of the spectrum with at least 75% transmission in the visible region of the spectrum, and the method of producing such improved absorbing glass.

Another object is the provision of an absorbing glass of the above character containing vanadium in controlled amounts for producing desirable ultra-violet absorbing characteristics, manganese in controlled amounts for producing the desired color characteristics, and other ingredients, combined at a controlled time-temperature cycle under controlled oxidizing conditions.

Another object of the invention is to provide a glass of the above character having desirable cosmetic color, such as a light warm and pleasant amethyst pink or flesh color, by combining controlled amounts of manganese with vanadium within controlled temperature-time cycles in a base glass of controlled composition, under controlled conditions of internal and furnace atmosphere.

Another object is to provide an absorbing glass of the above character having a refractive index of approximately 1.523 in order that such glass may be used as ophthalmic crown glass without requiring special equipment or procedures to mould or surface such items as lenses to desired powers.

Still another object is to provide an absorbing

2 glass of the above character which is capable of fusing with standard ophthalmic crown, flint or barium glasses used in the manufacture of bifocal or multifocal lenses without exhibiting devitrification or breakage characteristics.

Another object is to provide a glass of the character described which is stabilized against chemical attack and which can be worked and annealed with conventional glass making and working equipment without departing from standard glass manufacturing procedure, said glass having improved ultra-violet radiation absorption and improved visible transmission characteristics.

Other objects and advantages will become apparent from the following description, and it will be apparent that many changes may be made in the processes and article or articles resulting therefrom without departing from the spirit of the invention as expressed in the accompanying claims. The exact details are merely preferred forms given only by way of illustration and are not to be considered as limitations.

Since science has discovered that the eyes of animal life including the human eye should be protected from radiation in the spectrum below 365 millimicrons, it is desirable to perfect a glass for opthalmic lenses and the like having substantially complete absorption of radiation up to this point, the glass to be satisfactory for these purposes having at least 75% visual transmission and of a controlled color and shade.

Ultra-violet rays are very active chemically. It has been stated that the lenses of the human eye upon subjection to such rays become opacified upon lengthy exposure resulting, therefore, in impaired vision. Even short exposures to increasingly common artificial or natural sources of ultra-violet have been known to cause conjunctivitis, retardation of dark adaption, and other critical symptoms. Heretofore, most of the ultra-violet absorbing glasses such as might be employed for lenses, filters or the like have had incorporated therein various amounts of ultra-violet absorbing ingredients such as titanium, cerium, or iron with various other metal salts being added to the composition to control the color of the resulting glass. It is known, however, that the comparatively large amount of the ultra-violet absorbing ingredient, such as cerium, necessary to produce the glass with any satisfactory degree of ultra-violet absorbing characteristics affects possible shifts in other important properties of the finished glass, such as refractive index, color, durability, and fusibility, thus necessitating strict control of the quantity of ultra-violet absorbing ingredient used. It has also become increasingly difficult to secure certain ingredients commonly used in the manufacture of glass, particularly cerium, because of its present association with fissionable thorium.

The present invention teaches the use in glass compositions of vanadium in controlled proportions and in small quantities, the vanadium when combined with controlled proportions of manganese resulting in a glass having the desired ultra-violet absorption, visual transmission, and color. Glasses of the type produced by the present teachings, can also be controlled to match or replace present commercial tinted glasses, and by substituting vanadium for the cerium generally used as the ultra-violet absorbing ingredient eliminate the existing dependency upon unreliable and critical sources of material at a consequent decrease in raw material cost, and offer further possibility of being able to produce glasses having more desirable colors.

Although it has been previously specified that other ingredients such as titanium, cerium or iron with various other metal salts have been used in glass compositions for ultra-violet absorption, it is also well known in the art that vanadium may be used as an ultra-violet absorbing ingredient. Such known prior art uses of vanadium, however, in the past, resulted in a glass having a definite yellow, amber or greenish-yellow color which colors are decidedly undesirable and impractical for the use for which the particular glasses of the present invention are intended, namely, general ophthalmic use.

It is further known in the prior art that vanadium and manganese have also been combined in glass compositions but such prior art teachings resulted only in an amber colored glass.

The glasses of the present invention distinguish from the above-mentioned prior art glasses in that while possessing ultra-violet absorption characteristics, resulting from the use of vanadium, they further have an extremely desirable amethyst pink or flesh color resulting from the use of manganese and by the proper control of the relative proportions of the ingredients and control of the furnace and melting conditions.

With the present formula and modifications thereof it is possible to obtain in the absence of manganese a substantially colorless ultra-violet absorbing glass. This results in a much higher visible transmission than with the prior art green or amber colored glasses and distinguishes from the prior art in that it has been accomplished with a stable crown type glass having proper refractive index with good fusibility and workability, and also having the known characteristics of ophthalmic crown glass. A controlled amount of manganese is added to the glass composition for the purpose of obtaining the proper amethyst or flesh color to obtain desirable cosmetic affects of ophthalmic glasses or the like and also functions to prevent the formation of a greenish color by providing oxygen to keep the vanadium in its higher state of oxidation and to prevent undesirable coloration.

These results are obtained by careful proportioning of vanadium with manganese and controlling the oxidation, time and temperature of melting, and alkali proportions.

It is particularly pointed out that in order to introduce the ultra-violet absorbing characteristics and color control desired, relatively small amounts of the vanadium and manganese are required. Because of this fact, the vanadium and manganese can be embodied in a standard ophthalmic crown glass batch composition with the requirement of substantially little alteration of said batch. This is a further advantage of the present invention in that if cerium were added to a standard crown glass batch composition, it would require a definite change in said composition for the amount of cerium required would be relatively large in amounts of several per cent upwardly to 10% for obtaining equivalent ultra-violet absorbing characteristics and would be of a magnitude which would constitute an important element of the glass. This is also true in instances when titanium is used as an ultra-violet absorbing ingredient for in most instances, an amount upwardly to 15% or more would be required for equivalent ultra-violet absorption.

The use of a standard ophthalmic crown glass batch is particularly desirable because it possesses a desirable index of refraction of approximately 1.523, possesses desirable stability, permits refabrication, is readily fusible to other glasses, and may be reheated so that it may be rolled, drawn, blown, or otherwise manipulated to result in glasses of suitable thickness and shape for use in specific applications, the reworking not affecting the glass and requiring no special surface treatment.

This has been accomplished by adding carefully controlled amounts of the vanadium and manganese oxides to a soda-potash-lime-silica base glass and melting it at a controlled temperature and time cycle under definitely oxidizing conditions.

According to the teachings of this invention one base crown glass desirable for the uses disclosed herein is obtainable by using the following glass formula as a base.

TABLE A.—BATCH

| Ingredients | Parts by weight |
|---|---|
| Sand | 70.3 |
| Soda ash | 14.9 |
| Potassium nitrate | 4.6 |
| Potassium carbonate | 9.1 |
| Limestone | 20.6 |
| Salt | 1.0 |
| Salt cake | 1.0 |

When making a glass according to the above formula allowance should be made in accordance with the particular circumstances pertaining to individual batches to allow for deviations from theoretical composition because of volatilization loss particularly of alkalis, hygroscopicity, impurities or other deviations from theoretical compositions of raw materials, and for pot attack.

Glass produced from the above formula has outstanding characteristics with respect to all the practical criteria, the chemical durability is good, and the glass has a desirable coefficient of expansion for fusing with other ophthalmic glasses. Glass manufactured from the above indicated formula can also be reworked satisfactorily without crystallizing or turning opaque, and the surfaces may be ground and polished to conventional ophthalmic curves such as are in common commercial use.

In producing a glass having satisfactory properties, it is necessary to add to the composition fining agents such as sodium chloride, sodium sulphate or other ingredients as desired and in controlled proportions to improve the workability of the melt, a satisfactory formula for which would be chlorine ($Cl_2$) and sulphur trioxide ($SO_3$) having ranges of parts by weight of 0 to 2 and 0 to 1.5 respectively in a calculated analysis. Although the glass batch formula given above is for a crown glass of the preferred type, applicant's invention may be applied with the modifications suggested by teachings herein to various other well known types of glasses such as flint, barium, etc. glasses and also other metal oxides substituted in part for the soda, potash or lime may be used. It is possible to vary the ingredients and proportions of the base glass formula by controlled amounts according to the particular results desired. However, a base glass made in accordance with the present invention will preferably be made according to the following approximate chemical analysis:

TABLE B.—APPROXIMATE CHEMICAL ANALYSIS

| Ingredients | Parts by weight |
|---|---|
| Silica ($SiO_2$) | 70.4 |
| Soda ($Na_2O$) | 8.7 |
| Potash ($K_2O$) | 8.2 |
| Lime (CaO) | 11.5 |
| Chlorine ($Cl_2$) | 0.6 |
| Sulphur trioxide ($SO_3$) | 0.6 |

Applicant has found that vanadium pentoxide ($V_2O_5$) in controlled proportions and in small quantities may be incorporated into a glass composition such as set forth above to produce a glass having considerably improved ultra-violet absorbing characteristics as well as improved transmission of radiation in the visible spectrum, vanadium being found to be easily procurable and because of the small quantities required considerably decreasing the manufacturing cost compared to glass containing the commonly used ultra-violet absorbing oxides. Vanadium is found to be more absorbent of ultra-violet than cerium or other oxides generally used and the amount used may be varied considerably in combination with controlled amounts of manganese dioxide ($MnO_2$) without undesirably affecting the visible color of the resultant glass or shifting of other important glass properties.

Even if the teachings of the prior art as mentioned at the outset herein are carefully followed and the glass manufactured under suitable conditions as referred to by the prior art, the glass when completed may have the desired ultra-violet cutoff but may be found to have undesirable color characteristics, or may be of poor quality. Substitutions of certain of the ingredients of the batches or changes in quantities of color-controlling ingredients have been found generally to adversely affect the ultra-violet cutoff. However, by balancing the ratio of manganese to vanadium for a given melting temperature, excellent results are obtained with respect to the color characteristics of the resultant glass as well as improved transmission within the visible region of the spectrum. The amount of vanadium usable in the manufacture of ultra-violet absorbing glass can be varied to a considerable extent without materially altering the ultra-violet absorption characteristics of the glass. It has been found that with a given vanadium pentoxide ($V_2O_5$) content and melting temperature, the quantity of manganese dioxide ($MnO_2$) in the batch can be varied considerable to control the color of the resultant glass to obtain the desirable amethyst or flesh tints.

For ophthalmic purposes, it is usually considered that a satisfactory ultra-violet absorbing glass has less than 5% transmission at wave length shorter than 356 millimicrons for a thickness of 2 millimeters. Others consider that there ought to be more ultra-violet absorption of a longer wave length, that is, there should be only 1% transmission up to 365 millimicrons for a thickness of two millimeters. The teachings of the present invention permit both such glasses to be made as well as other corresponding glasses.

Figure 1:
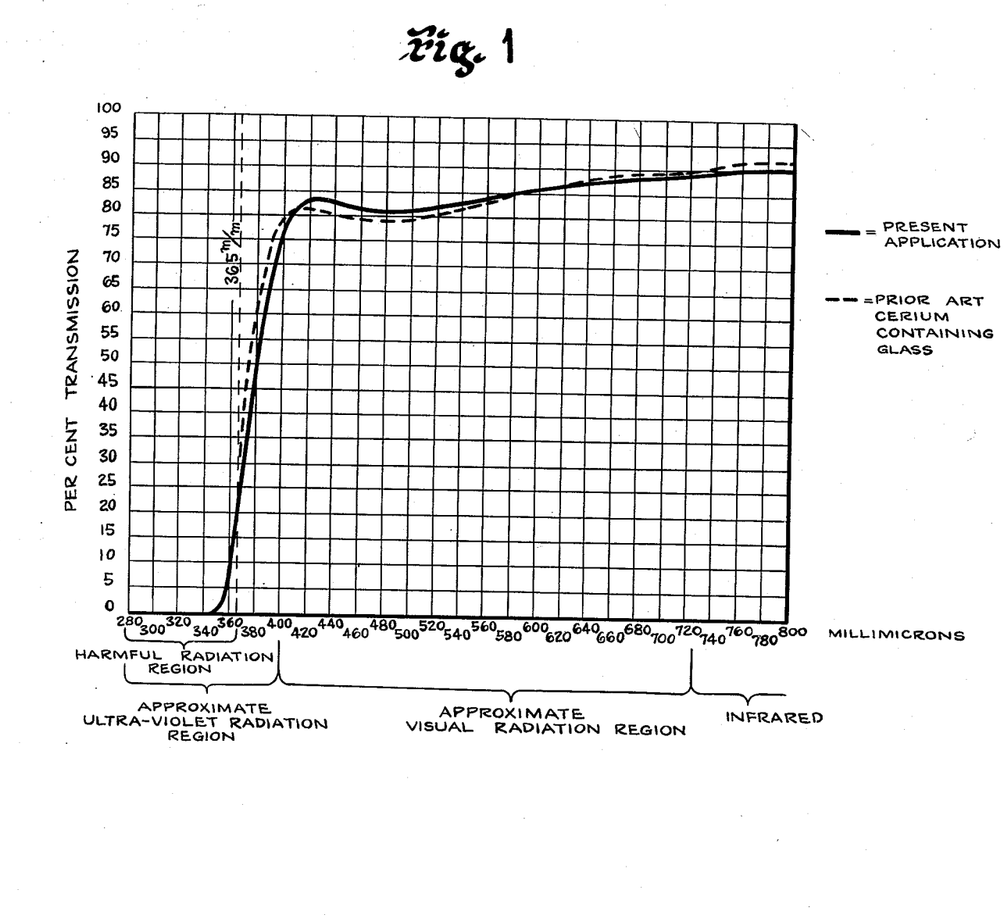
Fig. 1 of the drawings illustrates a typical spectral transmission curve of a common type of cerium-containing glass and a similar transmission curve of a vanadium-manganese containing glass made according to the present teachings in an attempt to duplicate the cerium-containing glass.

Fig. 1 gives the transmission curve of the glass having a cut off of 5% at 356 to 358 millimicrons.

Figure 2:
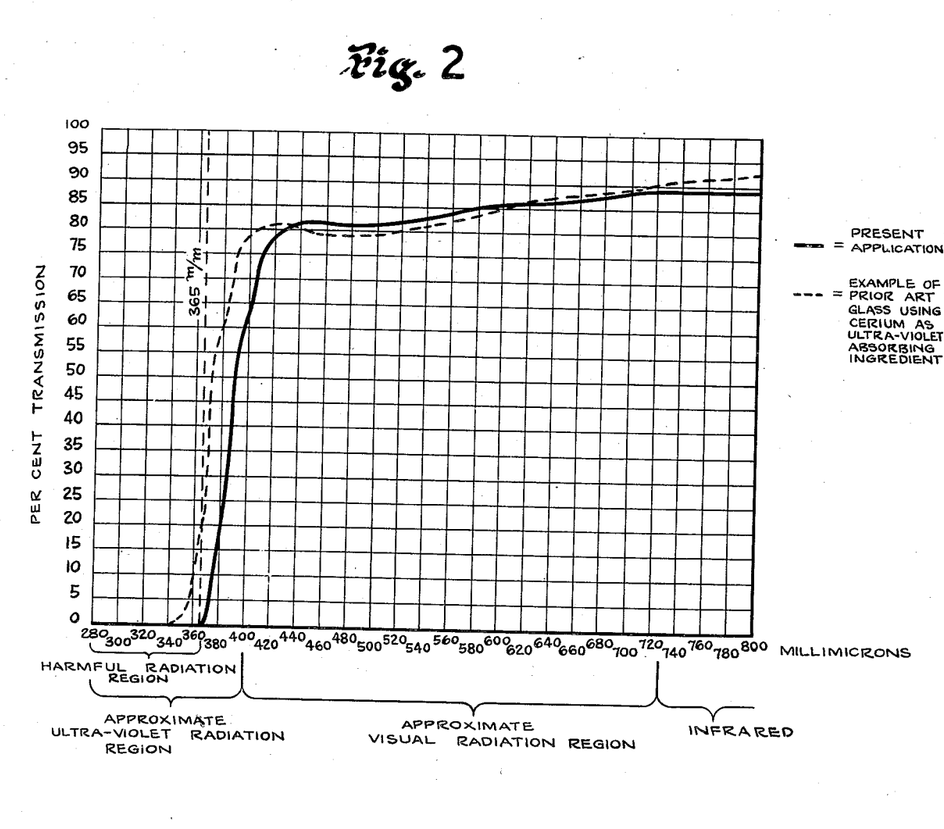
Fig. 2 illustrates a typical transmission curve of a vanadium-manganese glass made according to the present teachings, in an attempt to provide a glass having improved characteristics over the cerium-containing glass, a curve for which is also illustrated in this figure.

Fig. 2 gives the transmission curve of the glass having a cut off of 1% at 365.

Glasses resulting from the above teachings produce extremely desirable results in that they are readily fusable with commercially known ophthalmic flint, barium crown and crown glasses which is of extreme importance, particularly in forming, for example, fused multifocal lenses, color wedges or the like.

Another desirable feature is that the glasses may be readily reworked without introducing devitrification and may be readily fused to other glasses such as commercially known ophthalmic flint, barium crown, and crown glasses without danger of devitrification throughout the contiguous surfaces of the joined glasses.

The control of the index of refraction of the glass whereby the resultant glass will have an index of refraction of approximately 1.523 is of extreme importance in the art, particularly in the art of forming ophthalmic lenses wherein differently curved surfaces are produced by tools commercially known as laps. These laps are provided with a series of different curvatures computed according to the index of refraction of the glass with which they are to be used. Such tools are part of the present standard equipment of dispensers of ophthalmic products, particularly lenses, who use these tools in forming what is known as prescriptive surfaces on lens blanks and in view of the fact that the tools have their various curved surfaces computed for use for a glass having an index of refraction of 1.523, it renders the glass of the present invention particularly desirable in that it can be controlled so as to have an index of refraction of this value.

Requirements for a satisfactory absorbing glass call for a glass having a spectral transmission curve characterized by less than 5% ultra-violet transmission up to 356 millimicrons wavelength. It is to be understood that these and all herein mentioned specifications recited with respect to transmission properties of the presently disclosed glass are based on thicknesses of 2.0 millimeters. The curve of such a satisfactory glass will show a steadily rising transmission between 365 millimicrons and approximately 400 millimicrons with more absorption however within this range than is present in prior art glasses of this character, with a substantially sharp rising curve existing between approximately 400 millimicrons and 440 millimicrons and a more neutral horizontal curve in the more visible region of the spectrum beyond 440 millimicrons to indicate transmission of at least 75% throughout this region, the presently disclosed glass being characterized by such a spectral transmission curve and having satisfactory color characteristics, this glass also not requiring especially purified raw materials such as has been the case with glasses using cerium as the ultra-violet absorbing ingredient. Cerium, since it has to be freed from the closely associated praeseodymium and neodymium, thereby greatly increases the cost of the raw material. In practice it has been found that some neodymium remains even with so-called chemically pure cerium oxides, and it has been found necessary to carefully specify and control the tolerable neodymium content of cerium oxide. Vanadium even in the form of its low-priced, least purified sources has been found suitable for use in glasses of the present teachings and yields a flat neutral transmission curve free from selective absorption bands.

Vanadium pentoxide ($V_2O_5$) may be added to the batch mix in controlled quantities ranging from 0.2 to 1 part by weight, the CaO content of the batch mix for the base glass to be lowered in accordance with the amount of $V_2O_5$. Using more than 1 part $V_2O_5$ to obtain the desired ultra-violet absorption, it has been found that excessive undesirable yellow tints are apt to be apparent in the resultant glass. Lowering the content of $V_2O_5$ below 1% results in a glass still having the desired ultra-violet cutoff and makes it much easier to meet the visual transmission and color requirements.

It was found also that whatever quantity of $V_2O_5$ was used, it was necessary to carefully balance the color controlling manganese ($MnO_2$) against it, since excessive manganese tends to too purple or reddish tints and too low visual transmission in the resultant glass, while insufficient manganese leads to yellow tints, the ultra-violet cutoff apparently not being affected by the manganese content.

Since minor shifts of one or two tenths per cent in the amount of $V_2O_5$ effect little change in the ultra-violet cutoff of the resultant glass, the proportions of $MnO_2$ can be controlled to regulate other characteristics of the glass such as color and visual transmission. Decreasing the amount of $V_2O_5$ results in a glass having less yellow coloring. $MnO_2$ can also be decreased and still give desirable tints. At 0.75 part by weight of $V_2O_5$ a satisfactory pink amethyst or flesh color can be obtained by using 0.18 parts of $MnO_2$, this mixture also resulting in a glass having visual transmission of 84% or higher. Thus an analysis of a desirable glass embodying the invention would be:

TABLE C

| Ingredients | Specific Example, Parts by Weight | Range, Parts by Weight |
|---|---|---|
| Silica ($SiO_2$) | 70.4 | 67-70 |
| Soda ($Na_2O$) | 8.7 | 0-17 |
| Potash ($K_2O$) | 8.2 | 0-17 |
| Lime (CaO) | 10.5 | 9-14 |
| Chlorine ($Cl_2$) | 0.6 | 0-2 |
| Sulphur Trioxide ($SO_3$) | 0.6 | 0-1.5 |
| Vanadium Pentoxide ($V_2O_5$) | 0.8 | 0.2-1.2 |
| Manganese Dioxide ($MnO_2$) | 0.2 | 0.15-0.45 |

The above specific example produces a glass having the desired characteristics when melted on a one pound scale with an oxidizing atmosphere for two hours at a temperature of 2550° F., with one hour being permitted for soaking at 2200° F., and the glass may be poured or worked from 2200° to 1800° F., annealed at 1100° F., and then cooled slowly. Of course the best temperatures and time cycles will vary with the scale of the melting. The resultant glass, when composed of the ingredients in approximately the proportions indicated in the specific example of Table C, will have the desired ultra-violet cutoff of 1% or less at 365 millimicrons, at least 75% visible transmission, and will be characterized by an amethyst pink or flesh color, which latter feature is extremely important for obtaining the desired cosmetic effect with glasses used particularly for ophthalmic mountings and the like.

These characteristics are indicated in Fig. 2 of the drawings to illustrate the presently produced glass in comparison with a commonly used cerium-containing glass, showing that in view of the latest scientific findings relative to ultra-violet radiation the present glass has decided improvements over the prior glass while maintaining strict cosmetic color control indicated by the level of the curve in the visible spectrum, and good visual transmission.

If it is desired to merely duplicate the characteristics of prior art cerium-containing glasses this can be accomplished by varying the proportions of manganese and vanadium and controlling the process as taught herein. Such a duplication is indicated in Fig. 1 of the drawings wherein a glass made according to the present teachings has been made to approach a cerium-containing glass having ultra-violet transmission of approximately 5% at 356 millimicrons in the spectrum, the compared glasses both having the same favorable visual transmission characteristics except that the presently described vanadium-containing glass develops a slightly more level curve in this area.

A series of tests conducted to learn the effects of variations in melting cycles reveals that prolonging the soak at 2200° F. improves the quality of the resultant glass, lessens scum and favors more amethyst color development. Prolonging soaking at 2200° does not appreciably effect the manganese amethyst color development after the color has been destroyed by high melting temperatures (2550° to 2600°) but on lowering the maximum melting temperature to 2500° the amethyst color deepens appreciably with soaking at 2200°.

The presence of nitrate or equivalent oxygen evolver within the melt is essential to the obtaining of the desired color regardless of the degree of oxidation of the furnace atmosphere since the omission of nitrate from the batch will produce a green-colored glass. Even relatively low amounts of nitrates will shift the green to a warm amber. Measured proportions of potassium nitrate ($KNO_3$) produced the best results. However, the nitrate can be adjusted to suit the melting conditions and the results desired. The degree of oxidation can be regulated by the distribution of potassium oxide requirements between carbonate and nitrate and sodium oxide between carbonate and nitrate. Calcium nitrate can be used to assist or replace the alkali nitrates, up to a very large excess if desired. Also barium peroxide can be used as a source of oxygen with the resultant barium oxide (BaO) replacing the lime (CaO) content. This will lead to warmer colors but will lower the refractive index of the glass. Raising the index to the desired 1.523 figure by adding larger proportions of bivalent oxides or alkali oxides will further promote amethyst color developments, but will require further adjustments for thermal expansion and other properties.

Small amounts of saltcake ($Na_2SO_4$) in the batch promote fining and tend to favor amethyst color but too large a proportion of saltcake produces a green color. If saltcake is included in the batch it will be found critical to determine the optimum proportion for the particular type and scale of melting procedure and the furnace used, and the amount should preferably be held to the limits set forth in Tables A and C.

It is important to note that varying levels of oxidation can result in satisfactory glasses if the vanadium and manganese contents are carefully controlled. At 1% vanadium and 3.4 parts nitrate per 100 parts of sand, the manganese content can be increased from 0.20% to 0.45% and the ultra-violet absorption will remain constant at less than 1% transmission at 365 millimicrons, with the visual transmission decreasing from 85% to 76%, and with an obvious darkening range of color from a warm amber to a reddish amethyst color. With the same conditions existing as above except that the nitrate content is 11 parts per 100 sand the manganese can be varied from 0.20% to 0.40% with a decrease in visual transmission from 86% to 79% and range of color from a warm amber to amethyst. With a nitrate content of 26 parts per 100 sand the manganese variance from 0.20% to 0.40% will cause a decrease in visual transmission from 86% to 77%, and a color range from warm amber to a reddish amethyst rose color. Adding nitrate up to 31 parts per 100 sand and with a manganese content varied only from 0.20% to 0.24% the visual transmission decreased only to 84% from 86% while the color could be controlled from yellow to amethyst.

Table D which follows presents the results of varying melting temperatures at various $MnO_2$ contents with the $V_2O_5$ constant at 1% melted for 1½ hours at maximum temperature, then held at 2200° F. for 3½ hours:

TABLE D

| Per Cent $MnO_2$ | Maximum Temp. °F. | Per Cent Visual Trans. |
|---|---|---|
| 0.20 | 2,550 | 86 |
| 0.24 | 2,550 | 84 |
| 0.30 | 2,550 | 79 |
| 0.20 | 2,500 | 83 |
| 0.24 | 2,500 | 82 |
| 0.26 | 2,500 | 81 |
| 0.28 | 2,500 | 82 |
| 0.20 | 2,450 | 85 |
| 0.24 | 2,450 | 81 |
| 0.26 | 2,450 | 82 |
| 0.28 | 2,450 | 81½ |
| 0.20 | 2,400 | 83 |
| 0.24 | 2,400 | 83 |
| 0.26 | 2,400 | 81 |
| 0.28 | 2,400 | 79 |

All of the melts in Table D resulted in a glass having the desired ultra-violet cut-off and refractive index, and range in color from yellow to amethyst red.

Lowering the $V_2O_5$ content and adjusting $MnO_2$ accordingly, with melting temperature being varied between 2500° F. and 2650° F., and nitrate content held at 3 parts per 100 sand, produces very desirable glasses ranging from neutral amethyst to purple. With this lowered $V_2O_5$ there is so much less yellow that $MnO_2$ can also be lowered and still give desirable colors and desirable increases in the visual transmission.

Table E gives examples of this range of quantities and temperatures:

TABLE E

| Per Cent $V_2O_5$ | Per Cent $MnO_2$ | Temp. | Vis. Trans. |
|---|---|---|---|
| 1.20 | 0.20 | 2,550 | 85 |
| 1.00 | 0.25 | 2,500 | 81 |
| 1.00 | 0.20 | 2,550 | 83 |
| 0.90 | 0.20 | 2,550 | 86 |
| 0.85 | 0.25 | 2,500 | 81 |
| 0.85 | 0.23 | 2,525 | 83 |
| 0.85 | 0.20 | 2,500 | 84 |
| 0.85 | 0.20 | 2,525 | 83 |
| 0.85 | 0.197 | 2,500 | 82 |
| 0.85 | 0.167 | 2,525 | 84 |
| 0.83 | 0.30 | 2,550 | 81 |
| 0.83 | 0.23 | 2,550 | 84 |
| 0.80 | 0.20 | 2,550 | 88 |
| 0.80 | 0.20 | 2,525 | 85 |
| 0.75 | 0.30 | 2,650 | 84 |
| 0.75 | 0.25 | 2,650 | 85 |
| 0.75 | 0.18 | 2,650 | 89 |
| 0.75 | 0.17 | 2,525 | 84 |
| 0.75 | 0.15 | 2,525 | 86 |
| 0.70 | 0.17 | 2,525 | 84 |

Fused vanadium pentoxide available in large quantities from established producers is practical for commercial production of the type of glass disclosed by the present teachings, although vanadium may be derived from other sources such as 99.9% pure vanadium pentoxide, air dried technical grade vanadium pentoxide, and technical sodium orthovanadate. Since all these forms of vanadium result in glasses having substantially the same ultra-violet cut-off, visual transmission and color, there is no choice between them for results and the lowest-priced one can be selected.

Additional coloring or color modifying ingredients may be provided as desired to obtain various results with respect to color control. Iron oxide ($Fe_2O_3$) additions up to 0.1% have very little effect on these glasses containing $V_2O_5$ and $MnO_2$. With 0.75% $V_2O_5$ and 0.17% $MnO_2$ contents the addition of traces of iron oxide in the form of rouge pinked and brightened the manganese amethyst, with further additions leading to a neutral, with yellow increasing as $Fe_2O_3$ approaches 0.1%. Inclusion of from 0.05% to 0.1% of iron oxide in rouge form in a batch may well be desirable because it will lessen susceptibly to variations in the purity of raw material, give some fining action, and improve and stabilize the color without substantially effecting the ultra-violet cut-off or the visual transmission of the resultant glass.

Cobalt ($Co_1O_3$) additions may be used in minute quantities (1 part per million) particularly for the purpose of neutralizing yellow tints.

Copper (CuO) additions are able to change the color significantly and when added in amounts of from 0.0005% to 0.005% they raise the entire visible spectral curve from the violet to red by 1 to 2% without changing the shape of the curve. This may be desirable as a means to control the color towards a less reddish and more neutral but still warm and brilliant tint.

Additions of the above in a batch as well as of chromium (in fractional parts per million) or titania (up to 3%) either alone or in combination, may be useful in some instances to modify the color in desirable directions, while such ingredients as tin, arsenic and antimony may be used to control the intensity of the manganese purple, thereby raising visual transmission.

Certain of these elements capable of existing in more than one valence state have been found to affect the oxygen equilibrium within the melt by their mere presence within the furnace. Iron and titania, for example, have repeatedly been observed to cause pinker, pleasanter colors in the vanadium-manganese glasses even when they were not incorporated in the batch and resultant glass, but were in separate pots within the same furnace. This suggests placing a small pot containing rouge or titania or both within the pot furnace during metling of vanadium-manganese glasses as a supplementary means of atmosphere and color control.

The glass batch formulas, final analysis, transmission curves, and percentages given above are by way of illustration only and should not be limitive of the invention except insofar as they are specifically recited in the appended claims.

Figure 3:
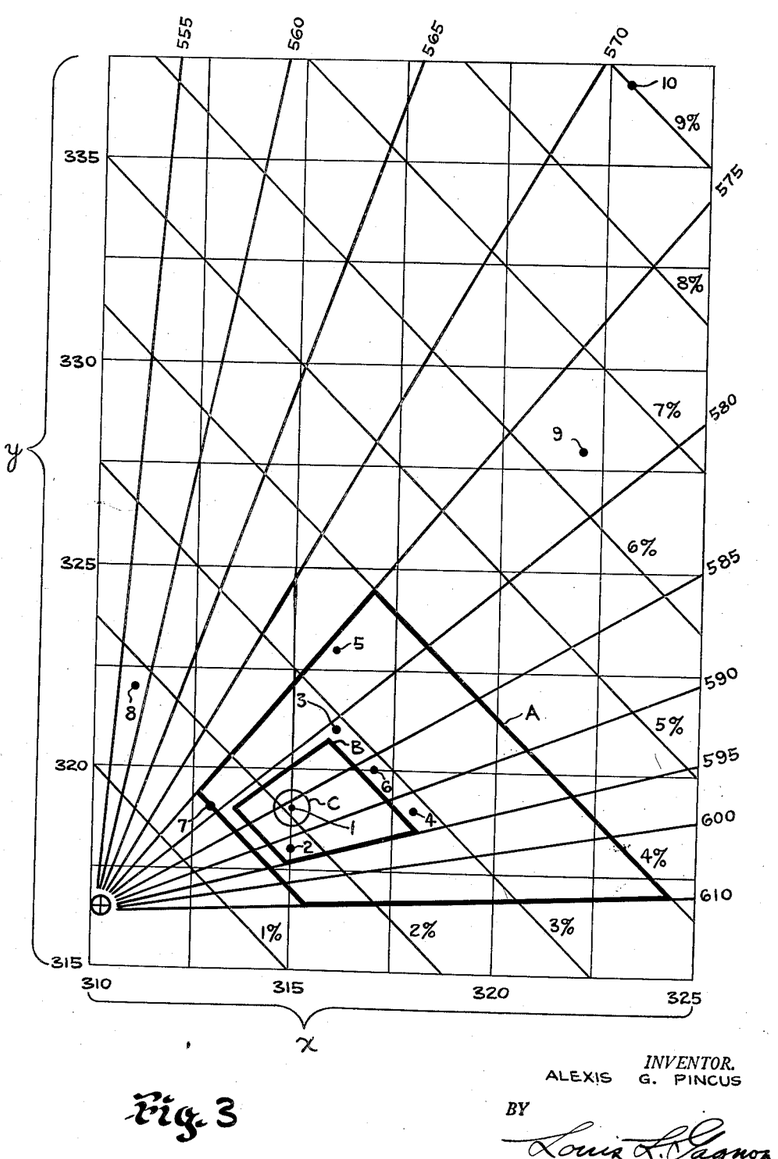
Fig. 3 is a chromaticity diagram taken from a standard text such as A. C. Hardy, "Handbook of Colorimetry," published by Technology Press, Cambridge, Mass. (1936) and specifies colors by means of the standard observer and coordinate system adopted in 1931 by the International Commission on Illumination.

The glasses produced by the procedures outlined above have been referred to as being of a controlled color or more specifically as having specific cosmetic color such as a light warm and pleasant amethyst pink or flesh color. Still more specifically, this color may be defined as outlined by the American Standards Association, Bulletin No. Z44-942 approved June 17, 1942, and entitled "Specification and Description of Color." The first method mentioned in this publication has already been utilized and illustrated in Figs. 1 and 2. To the scientist, these provide a complete specification of the colors desired for the glasses of this invention but in order to better define the color limits which are acceptable within the scope of this invention and to differentiate from prior art glasses of similar types, the color may be further defined by the second procedure given in the aforementioned bulletin using the standard observer and coordinate system adopted in 1931 by the International Commission on Illumination. These specifications will all be given in terms of the standard I. C. I. illuminant C, representative of average daylight, of a standard observer, and of a standard thickness of 2.0 millimeters. With reference to Fig. 3 in the accompanying drawing, there is given a plot of the $x$ and $y$ coordinates in the aforementioned color specification system and the color qualities derived from them, namely the dominant wavelength and the purity of the color being described. The third attribute of color, brightness, as derived from Y, has been found to agree almost exactly with the physical property "Visual Transmission" previously discussed and quoted for specific glass compositions and limits. Therefore, as previously stated, for the purposes of this invention, this property of brightness can be varied between the limits of 75 and the maximum of 92%, according to the particular shade desired and independently of the other two attributes of dominant wavelength and purity.

Referring to Figure 3, area A indicates the broadest range of colors which may be produced satisfactorily in accordance with the presently described procedure.

Area B refers to a narrower range of acceptable colors within the scope of the present invention, and area C refers to a specific color obtained as fully described hereinbefore in Table C and the accompanying descriptive matter.

The dominant wavelength of the desired and acceptable color range can be varied from 575 to 610 millimicrons inclusive, as indicated in area A, although it has been found that as the dominant wavelength approaches 575 millimicrons the color tint tends to become too yellow and as the dominant wavelength approaches 610 millimicrons it tends to become too reddish or in some cases purplish. Therefore, there is also included in Figure 3 an intermediate range area B in which the dominant wavelength is limited to a range between 581 and 595 millimicrons. The specific example indicated by area C has an approximate dominant wavelength of 586 millimicrons. The purity property is shown to vary in the broad area A between the values of 1.5-4%. In the intermediate area B it varies between 1.6-2.7%, while in the narrow area C it has the value of approximately 2.0%.

Table F which follows summarizes all of the color specification data by the I. C. I. system, including that reproduced on the chromaticity diagram in Figure 3. The specific example indicated by numeral 1 in Figure 3 describes the color obtained by small scale melts in accordance with the teachings of Table C and the accompanying descriptive matter. Although the preferred color is indicated in Figure 3 by numeral 1, desirable colors are obtainable within the scope of the present invention by varying the proportions of some of the ingredients used in the batch mixes, by varying the melting conditions, or by the addition of color modifying agents, as previously outlined. The colors obtained in these instances would fall within the areas A or B. All glasses having these color characteristics would also possess the desired ultra-violet absorbing characteristics if produced in accordance with the present teachings.

The specific Example 1 defines a glass meeting the ultra-violet absorbing specifications of less than 1% transmission up to a wavelength of 365 millimicrons. Example 2 refers to an actual glass produced having approximately 5% ultra-violet transmission at 356 millimicrons and also falls within area B. Example 3 refers to a glass having 5% ultra-violet transmission at 356 millimicrons which has a slight yellow cast but which would be acceptable or even desirable in some instances. Example 4 refers to a glass meeting the ultra-violet absorption specifications of less than 1% at 365 millimicrons having a slightly purplish cast and therefore falling within area A as does Example 3. Example 5 is another glass actually produced meeting the ultra-violet absorption specifications of less than 1% at 365 millimicrons, having a slightly yellow but acceptable color, and also being located within area A. All of the above examples indicate glasses which have been actually produced according to the teachings of the present invention but it is to be understood that many other glasses have been produced according to these teachings which fall within the areas defined in Figure 3.

Also indicated in Figure 3 are various prior art glasses. Numeral 6 refers to a prior art glass containing cerium and manganese and limited to an ultra-violet cut-off of 5% transmission at 356 millimicrons. Numeral 7 refers to another commercial cerium-containing glass of this type but with a higher visual transmission. It can be seen that both of these glasses, Examples 6 and 7, fall within the broad area A in Figure 3, but they do not meet the requirements of including an easily available and economical ultra-violet absorbing ingredient and they do not meet the higher standard of ultra-violet absorption, i. e. less than 1% transmission at 365 millimicrons.

Numerals 8, 9 and 10 refer to prior art glasses exhibiting ultra-violet absorption to varying extents and visual transmissions of the desired magnitudes. Examples 8, 9 and 10 do not have, however, the desired and acceptable cosmetic color characteristics, as is obvious from their positions in the chromaticity diagram, Figure 3, being located outside even the broadest limits which are considered desirable for present purposes.

In Table F which follows, all data is on the basis of Illuminant C and for a glass thickness of 2 millimeters XYZ are the tristimulus values of the I. C. I. coordinate system and $xyz$ are the trichromatic coefficients derived from the XYZ tristimulus values by dividing their sums into the individual values. Therefore, $x+y+z=1.000$. Therefore, if any two of the trichromatic coefficients are specified the third one is fixed. Lambda ($\lambda$) refers to the dominant wavelength obtained from a chart of the type presented in Figure 3 and which is standard in color specifications. $p$ is the excitation purity expressed in per cent, while B indicates brightness in per cent, B being so defined as to be identical with the tristimulus value Y.

Further following the recommendation of the bulletin of American Standards Association, there are quoted in Table F the colors of the examples cited specified in terms of the material standards of the Munsell System. These were computed from the basic specifications Y, $x$ and $y$ using interpolation data given in a report appearing in the Journal of the Optical Society of America, volume 33, page 385 (July 1943).

TABLE F

*Illuminant C.—Thickness 2 millimicrons*

EXAMPLE 1

$X=0.829$   $x=0.315$   $\lambda=586$ millimicrons
$Y=0.840$   $y=0.319$   $p=2.0\%$
$Z=0.963$   $z=0.366$   $B=84.0\%$ $X+Y+Z=2.632$   Munsell=(2.5YR) 9.2/0.5

EXAMPLE 2

$X=0.829$   $x=0.315$   $\lambda=592$ millimicrons
$Y=0.839$   $y=0.318$   $p=1.8\%$
$Z=0.967$   $z=0.367$   $B=83.9\%$ $X+Y+Z=2.635$   Munsell=(7.5R) 9.2/0.9

EXAMPLE 3

$X=0.851$   $x=0.316$   $\lambda=581$ millimicrons
$Y=0.867$   $y=0.321$   $p=2.8\%$
$Z=0.979$   $z=0.363$   $B=86.7\%$ $X+Y+Z=2.697$   Munsell=(7.5YR) 9.4/0.3

EXAMPLE 4

$X=0.785$   $x=0.318$   $\lambda=592$ millimicrons
$Y=0.788$   $y=0.319$   $p=2.8\%$
$Z=0.894$   $z=0.363$   $B=78.8\%$ $X+Y+Z=2.467$   Munsell=(7.5R) 9.0/1.0

EXAMPLE 5

$X=0.822$   $x=0.316$   $\lambda=576$ millimicrons
$Y=0.839$   $y=0.323$   $p=3.3\%$
$Z=0.939$   $z=0.361$   $B=83.9\%$ $X+Y+Z=2.600$   Munsell=(2.5Y) 9.2/0.4

EXAMPLE 6

$X=0.824$   $x=0.317$   $\lambda=587$ millimicrons
$Y=0.830$   $y=0.320$   $p=2.8\%$
$Z=0.942$   $z=0.363$   $B=83.0\%$ $X+Y+Z=2.596$   Munsell=(2.5YR) 9.2/0.6

EXAMPLE 7

$X=0.875$   $x=0.313$   $\lambda=579$ millimicrons
$Y=0.890$   $y=0.319$   $p=1.5\%$
$Z=1.027$   $z=0.368$   $B=89.0\%$ $X+Y+Z=2.792$   Munsell=(10YR) 9.5/0.2

EXAMPLE 8

$X=0.884$   $x=0.311$   $\lambda=558$ millimicrons
$Y=0.914$   $y=0.322$   $p=1.8\%$
$Z=1.042$   $z=0.367$   $B=91.4\%$ $X+Y+Z=2.840$   Munsell=(7.5GY) 9.6/0.4

EXAMPLE 9

$X=0.799$   $x=0.322$   $\lambda=578$ millimicrons
$Y=0.814$   $y=0.328$   $p=6.3\%$
$Z=0.872$   $z=0.350$   $B=81.4\%$ $X+Y+Z=2.485$   Munsell=(10YR) 9.1/0.8

EXAMPLE 10

$X=0.800$   $x=0.323$   $\lambda=572$ millimicrons
$Y=0.834$   $y=0.337$   $p=9.0\%$
$Z=0.840$   $z=0.340$   $B=83.4\%$ $X+Y+Z=2.474$   Munsell=(2.5GY) 9.2/1.1

It can be seen that the preferred glass has Munsell values of hue 2.5YR, value 9.2 and chroma 0.5. The values for Examples 2-5 are similarly recited as well as the values for the prior art glass, Examples 6-10. It will be noted that as the yellow limits of the acceptable colors are approached the Munsell hue approaches 2.5Y and as the red limits are approached the hue approximates 7.5R. The value varies only around 9.2 within the narrow range of from 9.0 to 9.4. The chroma varies between 0.3 and 1.0.

To further assist in the visualization of the colors considered desirable and acceptable for the purposes of this invention reference is further made to the color charts in Webster's New International Dictionary of the English language, Second Edition Unabridged, published by G & C Merriam Co., Springfield, Mass., 1942, between pages 528 and 529. With reference to Chart B in the above reference, the acceptable colors lie between numbers 30, 34, 38, 27, 31, 35, 39 and 28 inclusive.

Although these color specimens are opaque and represent reflection colors, transparent glasses can be compared with them by viewing the glasses against an opaque white background.

Therefore, from the above teachings, a glass can be produced which may be controlled to have from 5% ultra-violet transmission at 356 millimicrons to less than 1% transmission at 365 millimicrons, with controlled visual transmission of at least 75%, the color of this glass being controlled for desirable pinkish cosmetic effect, having a refractive index of 1.523, being fusible with all regular ophthalmic crown, barium, or flint glasses, and capable of being produced by ordinary glass factory methods. This has been accomplished as stated by combining controlled amounts of vanadium pentoxide and manganese dioxide in a soda-potash-lime-silica base crown glass and by melting within the temperature-time cycles given herein and under strong oxidizing conditions.

From the foregoing it will be seen that I have produced means and methods of a simple and efficient nature that will produce all of the objects and advantages of the present invention.

I claim:

1. A glass for use in the manufacture of lenses, filters and the like having ultra-violet absorption characteristics and a light amethyst color, said glass having a calculated analysis of approximately 70.4% silica, approximately 8.7% soda, approximately 8.2% potash, approximately 10.5% lime, approximately 0.6% chlorine, approximately 0.6% sulphur trioxide, approximately 0.8% vanadium pentoxide, and approximately 0.2% manganese dioxide.

2. A glass for use in the manufacture of lenses, filters and the like having ultra-violet absorption characteristics and a light amethyst color, said glass having an analysis indicating a silica content of approximately from 67% to 70%, soda content not exceeding approximately 17%, potash content not exceeding approximately 17%, lime content of approximately from 9 to 14%, chlorine content of approximately from 0 to 2%, sulphur trioxide content of approximately from 0 to 1.5%, vanadium pentoxide content of approximately from 0.2% to 1% and manganese dioxide content of approximately 0.15% to 0.45%.

3. An ultra-violet light absorbing optical crown glass of the character described comprising an oxidized glass that is substantially free of reducing agents and consisting by chemical analysis of approximately 67 to approximately 70% by weight of silica, about 0.2 to 1.2% by weight of vanadium pentoxide for introducing ultra-violet absorbing characteristics, from 0 to about 0.45% of manganese dioxide and the remainder consisting of lime, potash and soda, said glass when of a 2 millimeter thickness having a substantially high transmission for all wave lengths of the visible spectrum and transmitting less than five percent for wave lengths of ultra-violet light shorter than 356 millimicrons.

4. An ultra-violet light absorbing optical crown glass of the character described comprising an oxidized glass that is substantially free of reducing agents and consisting by chemical analysis of approximately 67 to approximately 70% by weight of silica, about 0.7 to 1.2% by weight of vanadium pentoxide for introducing ultra-violet absorbing characteristics, from 0 to about 0.45% of manganese dioxide and the remainder consisting of lime, potash and soda, said glass when of a 2 millimeter thickness having a substantially high transmission for all wave lengths of the visible spectrum and transmitting less than one percent for wave lengths of ultra-violet light shorter than 365 millimicrons.

5. An ultra-violet light absorbing optical crown glass of the character described comprising an oxidized glass that is substantially free of reducing agents and consisting by chemical analysis of approximately 67 to approximately 70% by weight of silica, about 0.2 to 1.2% by weight of vanadium pentoxide for introducing ultra-violet absorbing characteristics, about 0.15 to 0.45% of manganese dioxide and the remainder consisting of lime, potash and soda, said glass when of a 2 millimeter thickness having a substantially high transmission for all wave lengths of the visible spectrum with its dominant wave length between 575 and 610 millimicrons and transmitting less than five percent for wave lengths of ultra-violet light shorter than 356 millimicrons.

6. An ultra-violet light absorbing optical crown glass of the character described comprising an oxidized glass that is substantially free of reducing agents and consisting by chemical analysis of approximately 67 to approximately 70% by weight of silica, about 0.7 to 1.2% by weight of vanadium pentoxide for introducing ultra-violet absorbing characteristics, about 0.15 to 0.45% of manganese dioxide and the remainder consisting of lime, potash and soda, said glass when of a 2 millimeter thickness having a substantially high transmission for all wave lengths of the visible spectrum and transmitting less than one per cent for wave length of ultra-violet light shorter than 365 millimicrons.

7. An ultra-violet light absorbing optical crown glass of the character described comprising an oxidized glass that is substantially free of reducing agents and consisting by chemical analysis of approximately 67 to approximately 70% by weight of silica, about 0.2 to 1.2% by weight of vanadium pentoxide for introducing ultra-violet absorbing characteristics, about 0.15 to 0.45% of manganese dioxide and the remainder consisting of lime, potash and soda, said glass when of a 2 millimeter thickness having a substantially high transmission for all wave lengths of the visible spectrum and transmitting less than five per cent for wave lengths of ultra-violet light shorter than 356 millimicrons, and with a total transmission in the visible region of at least 75 per cent.

8. An ultra-violet light absorbing optical crown glass of the character described comprising an oxidized glass that is substantially free of reducing agents and consisting by chemical analysis of approximately 67 to approximately 70% by weight of silica, about .8% by weight of vanadium pentoxide for introducing ultra-violet absorbing characteristics, about .2% of manganese dioxide and the remainder consisting of lime, potash and soda, said glass when of a 2 millimeter thickness having a substantially high transmission for all wave lengths of the visible spectrum and transmitting less than one per cent for wave lengths of ultra-violet light shorter than 365 millimicrons.

9. An ultra-violet light absorbing optical crown glass of the character described comprising an oxidized glass that is substantially free of reducing agents and consisting by chemical analysis of approximately 67 to approximately 70% by weight of silica, about .8% by weight of vanadium pentoxide for introducing ultra-violet absorbing characteristics, about .2% of manganese dioxide and the remainder consisting of lime, potash and soda, said glass when of a 2 millimeter thickness having a substantially high transmission for all wave lengths of the visible spectrum and transmitting less than one per cent for wave lengths of ultra-violet light shorter than 365 millimicrons, said glass being of a light amethyst color and having a total transmission of about 84% in the visible region.

10. An ultra-violet light absorbing optical crown glass of the character described consisting substantially of approximately 70.4% by weight of sand, approximately 14.9% of soda ash, approximately 4.6% potassium nitrate, approximately 9.1% potassium carbonate, approximately 20.6% limestone, approximately 1% salt, approximately 1% salt cake, approximately 0.8% vanadium pentoxide, approximately 0.2% manganese oxide, said glass having a fraction of one per cent transmission for ultra-violet wave lengths shorter than 365 millimicrons.

11. An ultra-violet light absorbing optical crown glass of the character described comprising an oxidized glass that is substantially free of reducing agents and consisting by chemical analysis of approximately 67 to approximately 70% by weight of silica, about 0.7 to 1.2% by weight of vanadium pentoxide for introducing ultra-violet absorbing characteristics, and the remainder consisting of lime, potash and soda, said glass when of a 2 millimeter thickness having a substantially uniform high transmission for all wave lengths of the visible spectrum and transmitting less than one per cent for wave lengths of ultra-violet light shorter than 365 millimicrons.

12. An ultra-violet light absorbing optical crown glass of the character described comprising an oxidized glass that is substantially free of reducing agents and consisting by chemical analysis of approximately 67 to approximately 70% by weight of silica, about 0.2 to 1.2% by weight of vanadium pentoxide for introducing ultra-violet absorbing characteristics, and the remainder consisting of lime, potash and soda, said glass when of a 2 millimeter thickness having a substantially uniform high transmission for all wave lengths of the visible spectrum substantially free from selective absorptive bands and transmitting less than five per cent for wave lengths of ultra-violet light shorter than 356 millimicrons.

13. An ultra-violet light absorbing optical crown glass of the character described comprising an oxidized glass that is substantially free of reducing agents and consisting by chemical analysis of approximately 67 to approximately 70% by weight of silica, about 0.2 to 1.2% by weight of vanadium pentoxide for introducing ultra-violet absorbing characteristics, from 0.15 to 0.45% of manganese dioxide, and the remainder consisting of lime, potash and soda, with a trace of a color modifying oxide of a metal selected from the group consisting of iron, cobalt, copper, chromium, tin, arsenic, antimony and mixtures thereof, said glass when of a 2 millimeter thickness having a substantially high transmission for all wave lengths of the visible spectrum and transmitting less than one per cent for wave lengths of ultra-violet light shorter than 365 millimicrons.

14. The method of making an ultra-violet absorbing glass of the character described comprising forming a glass batch consisting of ingredients to yield approximately 67 to 70% silica, about 0.2 to 1.2% vanadium pentoxide, from 0 to about 0.45% of manganese dioxide and the remainder lime, potash and soda, melting said batch under oxidizing conditions at a temperature between about 2400 and 2650° F. and then soaking said melt at about 2200° F. to produce a glass having for a 2 millimeter thickness a transmission of less than about five per cent for wave lengths shorter than 356 millimicrons.

15. The method of making an ultra-violet absorbing glass of the character described comprising forming a glass batch consisting of ingredients to yield approximately 67 to 70% silica, about 0.7 to 1.2% vanadium pentoxide, from 0 to about .45% of manganese dioxide and the remainder lime, potash and soda, melting said batch under oxidizing conditions at a temperature in the neighborhood of 2500° F. and then soaking said melt at about 2200° F. to produce a glass having for a 2 millimeter thickness a transmission of less than about one per cent for wave lengths shorter than 365 millimicrons.

16. The method of making ultra-violet absorbing glass of the character described comprising forming a glass batch consisting of ingredients to yield by weight approximately 67 to 70% silica, about 0.2 to 1.2% vanadium pentoxide, about 0.15% to 0.45% of manganese dioxide and the remainder lime, potash and soda, melting said batch under oxidizing conditions at a temperature in the neighborhood of 2500° F. and soaking said melt at about 2200° F. to produce in the resultant glass at a thickness of two millimeters a light amethyst color and a transmission of less than about 5% for ultra-violet radiations of wave length up to about 356 millimicrons, and an overall transmission in the visible region of at least 75%.

17. The method of making ultra-violet absorbing glass of the characted described comprising forming a glass batch consisting of ingredients to yield by weight approximately 67 to 70% silica, about 0.7 to 1.2% vanadium pentoxide, about 0.15% to 0.45% of manganese dioxide and the remainder lime, potash and soda, melting said batch under oxidizing conditions at a temperature in the neighborhood of 2500° F. and soaking said melt at about 2200° F. for a time controlled to produce in the resultant glass at a thickness of two millimeters a warm amethyst flesh color and a transmission of less than about 1% for ultra-violet radiations of wave length up to about 365 millimicrons, and an overall transmission in the visible region of at least 80%.

18. The method of making ultra-violet absorbing glass of the character described comprising forming a glass batch consisting of ingredients to yield by weight approximately 67 to 70% silica, about .8% vanadium pentoxide, about .2% of manganese dioxide and the remainder lime, potash and soda, melting said batch under oxidizing conditions at a temperature within the range of from 2400° F. to 2650° F., lowering the temperature of the melt to about 2200° F. and holding it there for a time interval according to the temperature employed to produce in the resultant glass at a thickness of two millimeters a warm amethyst flesh color and a transmission of less than about 1% for ultra-violet radiations of wave length up to about 365 millimicrons, and an overall transmission in the visible region of approximately 84%.

19. The method of making ultra-violet absorbing glass of the character described comprising mixing a glass batch consisting of ingredients to yield by weight approximately 67 to 70% silica, about 0.7% to 1.0% vanadium pentoxide, about 0.15% to 0.45% of manganese dioxide and the remainder lime, potash and soda, with a source of oxidizing agents equal to approximately 1 to 35% by weight of the silica, melting said batch under oxidizing conditions at a temperature in the neighborhood of 2500° F. and soaking said melt at about 2200° F. to produce in the resultant glass at a thickness of two millimeters a light amethyst color and a transmission of less than about 1% for ultra-violet radiations of wave length up to about 365 millimicrons, and an overall transmission in the visible region of at least 80%.

20. The method of making ultra-violet absorbing glass of the character described comprising mixing a glass batch consisting of ingredients to yield by weight approximately 67 to 70% silica, about 0.2 to 1.2% vanadium pentoxide, about 0.15% to 0.45% of manganese dioxide and the remainder lime, potash and soda, with a source of oxidizing agents equal to about 1 to 35% by weight of the silica added and a color modifying metal oxide selected from the group consisting of the oxides of iron, cobalt, copper, chromium, tin, arsenic, antimony and mixtures thereof, placing said batch in a furnace containing an ingredient which by its presence will affect the oxygen equilibrium within the melt, melting said batch under oxidizing conditions at a temperature in the neighborhood of 2500° F., reducing the temperature of the melt to about 2200° F. and holding it at said temperature sufficient to produce in the resultant glass at a thickness of two millimeters a light amethyst color and a transmission of less than about 5% for ultraviolet radiation of wave length up to about 356 millimicrons, and an overall transmission in the visible region of at least 75%.

21. The method of making ultra-violet absorbing glass of the character described comprising mixing a glass batch consisting of ingredients to yield by weight approximately 70.4% silica, about .8% vanadium pentoxide, from about 0.15% to 0.45% of manganese dioxide and the remainder lime, potash and soda, with at least 3.5 parts of nitrates per 100 parts by weight of silica as oxidizing agent, melting said batch at a temperature in the neighborhood of 2550° F. and soaking said melt at about 2200° F. to produce in the resultant glass at a thickness of two millimeters a light amethyst color and a transmission of less than about 1% for ultra-violet radiations of wave length up to about 365 millimicrons, and an overall transmission in the visible region of approximately 84%.

ALEXIS G. PINCUS.

REFERENCES CITED

The following references are of record in the file of this patent:

UNITED STATES PATENTS

| Number | Name | Date |
|---|---|---|
| 1,292,148 | Taylor | Jan. 21, 1919 |

OTHER REFERENCES

Morey: Properties of Glass (1938) page 101.